United States Patent
Erickson et al.

(10) Patent No.: US 11,551,101 B2
(45) Date of Patent: *Jan. 10, 2023

(54) REAL TIME COGNITIVE REASONING USING A CIRCUIT WITH VARYING CONFIDENCE LEVEL ALERTS

(71) Applicant: International Business Machines Corporation, Armonk, NY (US)

(72) Inventors: Karl R. Erickson, Rochester, MN (US); Phil C. Paone, Rochester, MN (US); George F. Paulik, Rochester, MN (US); David P. Paulsen, Inver Grove Heights, MN (US); John E. Sheets, II, Zumbrota, MN (US); Gregory J. Uhlmann, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1451 days.

This patent is subject to a terminal disclaimer.

(21) Appl. No.: 15/818,977

(22) Filed: Nov. 21, 2017

(65) Prior Publication Data
US 2018/0349775 A1 Dec. 6, 2018

Related U.S. Application Data

(63) Continuation of application No. 15/612,272, filed on Jun. 2, 2017.

(51) Int. Cl.
*G06J 1/00* (2006.01)
*G06N 5/02* (2006.01)
(Continued)

(52) U.S. Cl.
CPC ............... *G06N 5/02* (2013.01); *G06F 15/76* (2013.01); *G06J 1/00* (2013.01); *G08B 3/00* (2013.01)

(58) Field of Classification Search
CPC ............................. G06G 7/14; G06J 1/00–02
See application file for complete search history.

(56) References Cited

U.S. PATENT DOCUMENTS

| 3,076,933 | A | | 2/1963 | Negrete |
| 3,376,570 | A | * | 4/1968 | Lawson ................. G06F 7/602 708/4 |

(Continued)

OTHER PUBLICATIONS

Carstens, *Open Bit Line Sensing: Writing Dummy Cells for Test Purpose*, An IP.com Prior Art Database Technical Disclosure, IP.com No. IPCOM000174809D, Qimonda 2008, Original Publication Date: Oct. 13, 2008, 2 pages.

(Continued)

*Primary Examiner* — Chuong D Ngo
(74) *Attorney, Agent, or Firm* — Nathan M. Rau

(57) ABSTRACT

Real time cognitive reasoning using a circuit with varying confidence level alerts including receiving a first set of data results and a second set of data results; transferring a first unit of charge from a first charge capacitor on the A-B circuit to a collection capacitor on the A-B circuit for each of the first set of data results that indicates a positive data point; transferring a second unit of charge from a second charge capacitor to the collection capacitor for each of the second set of data results that indicates a positive data point; and triggering a first sense amp on the A-B circuit if the charge on the collection capacitor exceeds a first charge threshold, indicating that the positive data points in the first set of data results is greater than the positive data points in the second set of data results to a first statistical significance with a first confidence level.

7 Claims, 6 Drawing Sheets

(51) Int. Cl.
  *G08B 3/00* (2006.01)
  *G06F 15/76* (2006.01)

(56) References Cited

U.S. PATENT DOCUMENTS

| | | | |
|---|---|---|---|
| 4,561,089 A | 12/1985 | Rouse et al. | |
| 4,800,518 A | 1/1989 | Miller | |
| 4,802,103 A | 1/1989 | Faggin et al. | |
| 4,896,156 A | 1/1990 | Garverick | |
| 5,376,915 A | 12/1994 | Takeuchi et al. | |
| 5,497,121 A | 3/1996 | D'Hont | |
| 5,768,501 A | 6/1998 | Lewis | |
| 6,081,468 A | 6/2000 | Taira et al. | |
| 6,130,568 A | 10/2000 | Kwon et al. | |
| 6,154,864 A | 11/2000 | Merritt | |
| 6,727,749 B1 * | 4/2004 | Quinn | G06J 1/00 330/69 |
| 6,982,431 B2 | 1/2006 | Modlin et al. | |
| 7,084,695 B2 | 8/2006 | Porter | |
| 7,111,260 B2 | 9/2006 | Visweswariah | |
| 7,139,743 B2 | 11/2006 | Indeck et al. | |
| 8,909,592 B2 | 12/2014 | Stergiou et al. | |
| 9,000,837 B1 | 4/2015 | Fifield | |
| 9,082,495 B2 | 7/2015 | Lee et al. | |
| 9,093,175 B2 | 7/2015 | Barth, Jr. et al. | |
| 9,147,144 B2 | 9/2015 | Potyrailo et al. | |
| 9,147,457 B2 | 9/2015 | Kim et al. | |
| 9,367,853 B2 | 6/2016 | Cronin et al. | |
| 9,411,009 B1 | 8/2016 | Aguayo Gonzalez et al. | |
| 9,478,303 B1 | 10/2016 | Parker | |
| 9,508,424 B2 | 11/2016 | Lee | |
| 9,916,538 B2 | 3/2018 | Zadeh et al. | |
| 9,916,890 B1 | 3/2018 | Erickson et al. | |
| 10,037,792 B1 | 7/2018 | Erickson et al. | |
| 10,043,568 B1 | 8/2018 | Erickson et al. | |
| 10,224,089 B2 | 3/2019 | Erickson et al. | |
| 10,236,050 B2 | 3/2019 | Erickson et al. | |
| 10,304,522 B2 | 5/2019 | Erickson et al. | |
| 10,418,094 B2 | 9/2019 | Erickson et al. | |
| 10,598,710 B2 | 3/2020 | Erickson et al. | |
| 2002/0159319 A1 | 10/2002 | Kirihata et al. | |
| 2003/0090706 A1 | 5/2003 | Rijavec et al. | |
| 2005/0160130 A1 * | 7/2005 | Korekado | G06F 1/02 708/801 |
| 2006/0062483 A1 | 3/2006 | Kondo et al. | |
| 2007/0070754 A1 | 3/2007 | Vogelsang | |
| 2008/0031351 A1 | 12/2008 | Baker | |
| 2010/0182859 A1 | 7/2010 | Kohler et al. | |
| 2013/0090706 A1 | 4/2013 | Nudo | |
| 2014/0063915 A1 | 3/2014 | Cronie et al. | |
| 2014/0122925 A1 | 5/2014 | Peake et al. | |
| 2014/0160832 A1 | 6/2014 | Ito | |
| 2014/0201426 A1 | 7/2014 | Ma | |
| 2014/0293715 A1 | 10/2014 | Barth, Jr. et al. | |
| 2015/0016193 A1 | 1/2015 | Lewis et al. | |
| 2015/0281612 A1 | 10/2015 | Lund et al. | |
| 2015/0358090 A1 | 12/2015 | Mactaggart | |
| 2017/0220918 A1 | 8/2017 | Entner | |
| 2018/0218766 A1 | 8/2018 | Erickson et al. | |
| 2018/0240512 A1 | 8/2018 | Erickson et al. | |
| 2018/0348271 A1 | 12/2018 | Erickson et al. | |
| 2018/0348272 A1 | 12/2018 | Erickson et al. | |
| 2018/0348273 A1 | 12/2018 | Erickson et al. | |
| 2018/0348274 A1 | 12/2018 | Erickson et al. | |
| 2018/0349774 A1 | 12/2018 | Erickson et al. | |
| 2018/0350422 A1 | 12/2018 | Erickson et al. | |
| 2018/0350423 A1 | 12/2018 | Erickson et al. | |

OTHER PUBLICATIONS

*Voltage Comparator, Chapter 6—Analog Integrated Circuits*, All About Circuits, Electronics Textbook, <https://www.allaboutcircuits.com/textbook/experiments/chpt-6/voltage-comparator/>, EETech Media, LLC, printed Mar. 10, 2017, 3 pages.

U.S. Appl. No. 15/437,482, to Karl R. Erickson et al., entitled, *Predicting Data Correlation Using Multivalued Logical Outputs In Static Random Access Memory (SRAM) Storage Cells*, assigned to International Business Machines Corporation, 29 pages, filed Feb. 21, 2017.

U.S. Appl. No. 15/420,679, to Karl R. Erickson et al., entitled, *Big Data Analysis Using Low Power Circuit Design*, assigned to International Business Machines Corporation, 31 pages, filed Jan. 31, 2017.

U.S. Appl. No. 15/612,272, to Karl R. Erickson et al., entitled, *Real Time Cognitive Reasoning Using A Circuit With Varying Confidence Level Alerts*, assigned to International Business Machines Corporation, 41 pages, filed Jun. 2, 2017.

U.S. Appl. No. 15/612,360, to Karl R. Erickson et al., entitled, *Cognitive Analysis Using Applied Analog Circuits*, assigned to International Business Machines Corporation, 37 pages, filed Jun. 2, 2017.

U.S. Appl. No. 15/612,433, to Karl R. Erickson et al., entitled, *Real Time Cognitive Monitoring Of Correlations Between Variables*, assigned to International Business Machines Corporation, 41 pages, filed June 2, 2017.

U.S. Appl. No. 15/612,316, to Karl R. Erickson et al., entitled, *Optimizing Data Approximation Analysis Using Low Power Circuitry*, assigned to International Business Machines Corporation, 34 pages, filed Jun. 2, 2017.

U.S. Appl. No. 15/892,037, to Karl R. Erickson et al., entitled, *Predicting Data Correlation Using Multivalued Logical Outputs In Static Random Access Memory (SRAM) Storage Cells*, assigned to International Business Machines Corporation, 24 pages, filed Feb. 28, 2018.

U.S. Appl. No. 15/822,479, to Karl R. Erickson et al., entitled, *Optimizing Data Approximation Analysis Using Low Power Circuitry*, assigned to International Business Machines Corporation, 28 pages, filed Nov. 27, 2017.

U.S. Appl. No. 15/820,301, to Karl R. Erickson et al., entitled, *Real Time Cognitive Monitoring Of Correlations Between Variables*, assigned to International Business Machines Corporation, 34 pages, filed Nov. 21, 2017.

U.S. Appl. No. 15/818,929, to Karl R. Erickson et al., entitled, *Cognitive Analysis Using Applied Analog Circuits*, assigned to International Business Machines Corporation, 31 pages, filed Nov. 21, 2017.

Appendix P; List of Patents or Applications Treated as Related, Feb. 27, 2018, 2 pages.

U.S. Appl. No. 16/000,207, to Karl R. Erickson et al., entitled, *Optimizing Data Approximation Analysis Using Low Power Circuitry*, assigned to International Business Machines Corporation, 34 pages, filed Jun. 5, 2018.

U.S. Appl. No. 16/001,420, to to Karl R. Erickson et al., entitled, *Optimizing Data Approximation Analysis Using Low Power Circuitry*, assigned to International Business Machines Corporation, 34 pages, filed Jun. 6, 2018.

Appendix P; List of IBM Patent or Applications Treated as Related, Sep. 14, 2018, 2 pages.

Kozma et al., *A Low-Power Current-Mode Correlation Detector with Analog Data Storage*, 2004 IEEE Region 10 Conference (TENCON 2004), Nov. 2004, vol. 2, pp. 442-445, IEEE Xplore Digital Library (ieee.org) online, DOI: 10.1109/TENCON.2004.1414627, URL: ieeexplore.ieee.org/abstract/document/1414627/.

* cited by examiner

US 11,551,101 B2

REAL TIME COGNITIVE REASONING USING A CIRCUIT WITH VARYING CONFIDENCE LEVEL ALERTS

CROSS-REFERENCE TO RELATED APPLICATION

This application is a continuation application of U.S. patent application Ser. No. 15/612,272, filed Jun. 2, 2017.

BACKGROUND

Field of the Invention

The field of the invention is data processing, or, more specifically, methods, apparatus, and products for real time cognitive reasoning using a circuit with varying confidence level alerts.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for real time cognitive reasoning using a circuit with varying confidence level alerts are disclosed in this specification. Real time cognitive reasoning using a circuit with varying confidence level alerts includes receiving, by an A-B circuit, a first set of data results and a second set of data results, wherein each set of data results comprises binary data points, and wherein the A-B circuit compares the first set of data results to a weighted second set of data results; transferring a first unit of charge from a first charge capacitor on the A-B circuit to a collection capacitor on the A-B circuit for each of the first set of data results that indicates a positive data point, wherein the first unit of charge increases the charge on the collection capacitor; transferring a second unit of charge from a second charge capacitor to the collection capacitor for each of the second set of data results that indicates a positive data point, wherein the second unit of charge decreases the charge on the collection capacitor, and wherein the capacity of the first charge capacitor is different from the capacity of the second charge capacitor; triggering a first sense amp on the A-B circuit if the charge on the collection capacitor exceeds a first charge threshold, indicating that the positive data points in the first set of data results is greater than the positive data points in the second set of data results to a first statistical significance with a first confidence level; and triggering a second sense amp on the A-B circuit if the charge on the collection exceeds a second charge threshold, indicating that the positive data points in the first set of data results is greater than the positive data points in the second set of data results to a second statistical significance with a second confidence level.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
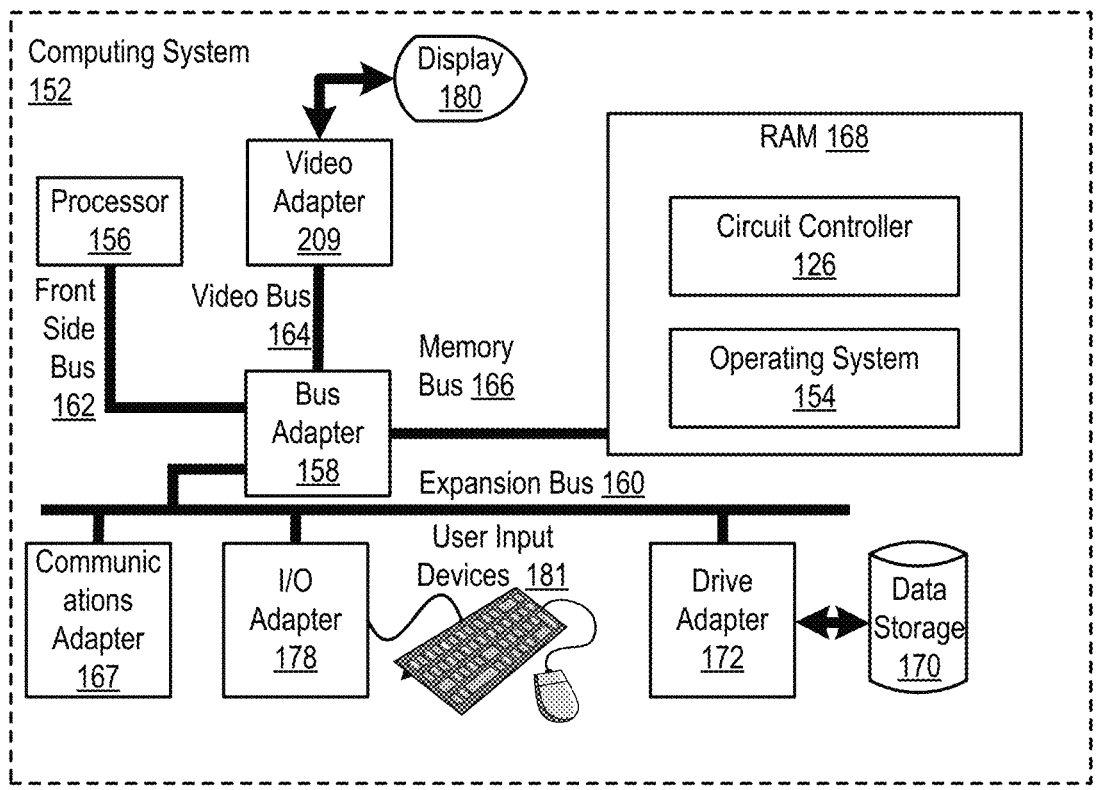
FIG. 1 sets forth a block diagram of an example system configured for real time cognitive reasoning using a circuit with varying confidence level alerts according to embodiments of the present invention.

Exemplary methods, apparatus, and products for real time cognitive reasoning using a circuit with varying confidence level alerts in accordance with the present invention are described with reference to the accompanying drawings, beginning with FIG. 1. FIG. 1 sets forth a block diagram of automated computing machinery comprising an exemplary computing system (152) configured for real time cognitive reasoning using a circuit with varying confidence level alerts according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for real time cognitive reasoning using a circuit with varying confidence level alerts according to embodiments of the present invention include UNIX", Linux™, Microsoft XP™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) is a circuit controller (126), a module of computer program instructions for real time cognitive reasoning using a circuit with varying confidence level alerts.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for real time cognitive reasoning using a circuit with varying confidence level alerts according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for real time cognitive reasoning using a circuit with varying confidence level alerts according to embodiments of the present invention include modems for wired dial-up communications, Ethernet (IEEE 802.3) adapters for wired data communications, and 802.11 adapters for wireless data communications.

Figure 2:
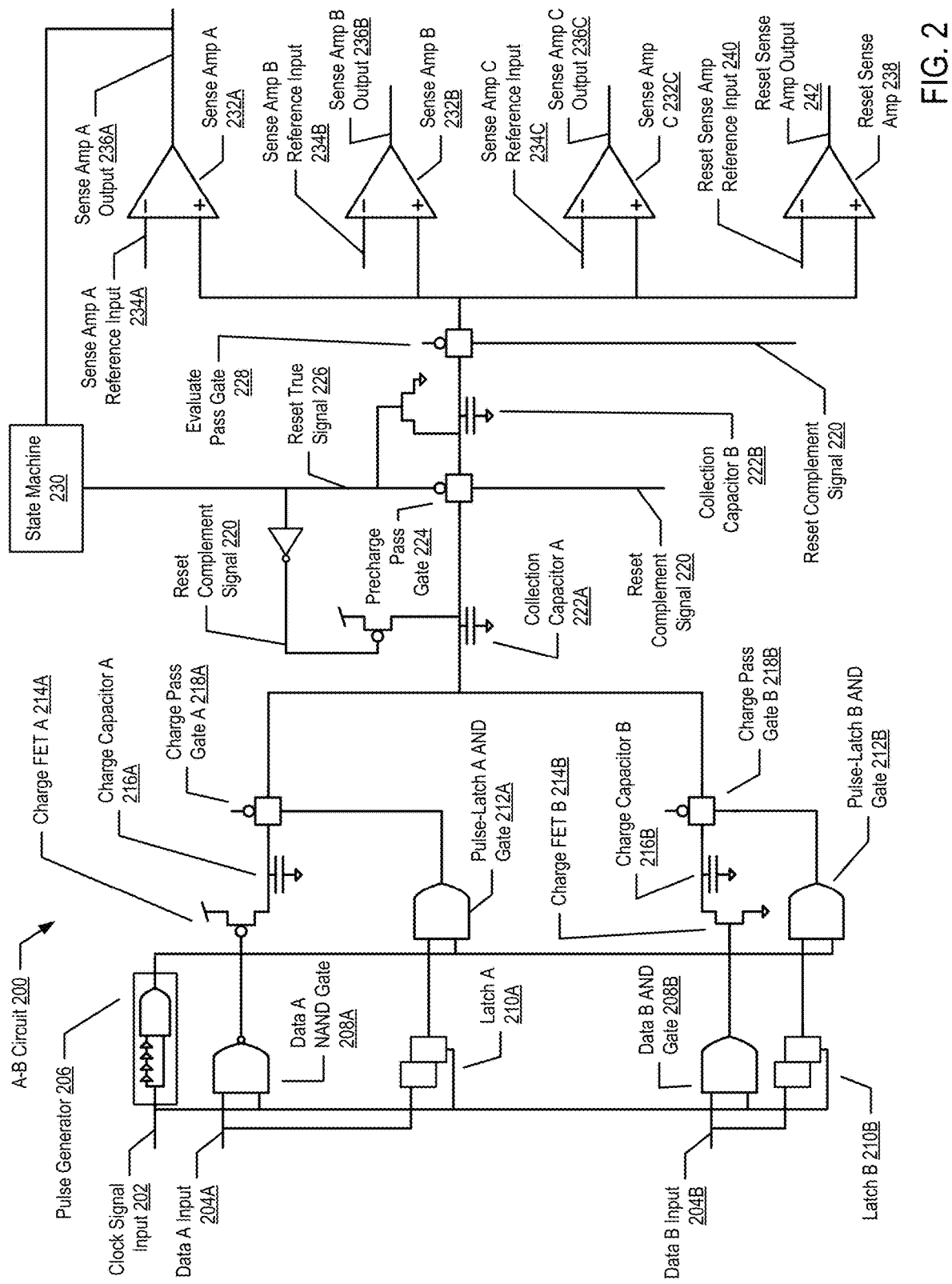
FIG. 2 sets forth a circuit configured for real time cognitive reasoning using a circuit with varying confidence level alerts according to embodiments of the present invention.

For further explanation, FIG. 2 shows elements of an example circuit (200) configured for real time cognitive reasoning using a circuit with varying confidence level alerts in accordance with the present invention. As shown in FIG. 2, the exemplary circuit (200) includes a clock signal input (202), a data A input (204A), a data B input (204B), a pulse generator (206), a data A NAND gate (208A), a data B AND gate (208B), a latch A (210A), a latch B (210B), a pulse-latch A AND gate (212A), a pulse-latch B AND gate (212B), a charge FET A (214A), a charge FET B (214B), a charge capacitor A (216A), a charge capacitor B (216B), a charge pass gate A (218A), a charge pass gate B (218B), a reset complement signal (220), a collection capacitor A (222A), a collection capacitor B (222B), a precharge pass gate (224), reset true signal (226), an evaluation pass gate (228), a state machine (230), a sense amp A (232A), a sense amp A reference input (234A), a sense amp A output (236A), a sense amp B (232B), a sense amp B reference input (234B), a sense amp B output (236B), a sense amp C (232C), a sense amp C reference input (234C), a sense amp C output (236C), a reset sense amp (238), a reset sense amp reference input (240), and a resent sense amp output (242). Although four sense amps are shown, more or less sense amps may be placed in the A-B circuit (200).

The example A-B circuit, in general, may be useful for comparing a number of positive data points in a first set of data results applied to data A input (204A) to a weighted number of positive data points in a second set of data results applied to data B input (204B). The example A-B circuit may also be useful for determining whether the difference between the positive data points in the first set of data results is greater than the weighted number of positive data points in the second set of data results to a statistical significance and with a specified confidence level.

The example A-B circuit may be configured to receive two sets of binary data via data A input (204A) and data B input (204B). For each positive data point (i.e., '1's or high bits) applied to the data A input (204A), a unit of charge is placed on the collection capacitors (collection capacitor A (222A), collection capacitor B (222B)). For each positive data point (i.e., '1's or high bits) applied to the data B input (204B), a weighted unit of charge is removed from the collection capacitors (collection capacitor A (222A), collection capacitor B (222B)). If the charge on the collection capacitors exceeds one or more charge thresholds (sense amp A reference input (234A), sense amp B reference input (234B), sense amp C reference input (234C)) on a set of sense amps (sense amp A (232A), sense amp B (232B), sense amp C (232C)) the sense amp generates a signal on an output (sense amp A output (236A), sense amp B output (236B), sense amp C output (236C)) indicating that the reference input threshold has been exceeded. Similarly, if the charge on the collection capacitors drops below a low charge threshold (reset sense amp reference input (240)), the reset sense amp (238) generates an output on the reset sense amp output (242) indicating that the charge on the collection capacitors has dropped below a low charge threshold.

The clock signal input (202) is a pin or other input wire configured to receive a timed clock pulse as one input into the pulse generator (206), data A NAND gate (208A), data B AND gate (208B), latch A (210A), and latch B (210B). The data inputs (data A input (204A), data B input (204B)) are pins or other input wires configured to receive signals corresponding to the data bits in the set of data results, such as signals corresponding to positive data points, and signals corresponding to negative data points.

The pulse generator (206) generates a pulse based on the clock signal input (202). The pulse generator (206) may generate a high signal on the falling edge of the clock signal. Specifically, the pulse generator (206) may generate a high signal upon detection that the clock signal is transitioning from high to low.

The latches (latch A (210A), latch B (210B)) are used to store a signal from the data inputs (data A input (204A), data B input (204B)) and provide that signal to the pulse-latch AND gates (pulse-latch A AND gate (212A), pulse-latch B AND gate (212B)). The pulse-latch AND gates (pulse-latch A AND gate (212A), pulse-latch B AND gate (212B)) receive signals from the pulse generator and the latches (latch A (210A), latch B (210B)), and transmit signals to the charge pass gates (charge pass gate A (218A), charge pass gate B (218B)).

The charging FETs (charge FET A (214A), charge FET B (214B)) control the charge placed on the charge capacitors (charge capacitor A (216A), charge capacitor B (216B)). The charge pass gates (charge pass gate A (218A), charge pass gate B (218B)) transfer the charges from the charge capacitors (charge capacitor A (216A), charge capacitor B (216B)) to the collection capacitors (collection capacitor A (222A), collection capacitor B (222B)). Charge capacitor B (216B) may have a different capacity than charge capacitor A (216A). Specifically, charge capacitor B may have a larger (e.g., 10% larger) capacity than charge capacitor A (216A) in order to place a weighted charge on the collection capacitors (collection capacitor A (222A), collection capacitor B (222B)).

The reset true signal (226) and the reset complement signal (220) are pins or other input wires configured to reset the charge on the collection capacitors (collection capacitor A (222A), collection capacitor B (222B)). The reset true signal (226) and the reset complement signal (220) trigger the reset circuitry on the circuit (200) that discharges the collection capacitors (collection capacitor A (222A), collection capacitor B (222B)), and precharges the collection capacitors to a midpoint voltage. The reset circuitry may be triggered, for example, by a circuit controller based on a sense amp output (sense amp A output (236A), sense amp B output (236B), sense amp C output (236C), reset sense amp output (242)), the number of samples received, the number of positive data point results received, or manually by a user.

The precharge pass gate (224) controls the voltage transfer between the collection capacitors during the precharge process. When closed, precharge pass gate (224) allows a voltage to be applied to only one collection capacitor (or one side of the precharge pass gate (224)). When open, the precharge pass gate (224) allows the voltage to transfer from one collection capacitor to another such that the voltages on both collection capacitors equalizes to a midpoint voltage that is half of the voltage applied to the first capacitor (assuming no voltage on the second collection capacitor prior to opening the precharge pass gate (224)). The precharge pass gate (224) may be operated using the reset true signal (226) and the reset complement signal (220).

The precharge pass gate (224) may be used to precharge the collection capacitors (collection capacitor A (222A), collection capacitor B (222B)) to a midpoint voltage. Precharging the collection capacitors to a midpoint voltage includes closing the precharge pass gate (224) and the evaluate pass gate (228), placing a voltage above the midpoint voltage on collection capacitor A (222A), placing a voltage below the midpoint voltage on collection capacitor B (222B); and opening the precharge pass gate (224) causing the collection capacitor A (222A) and collection capacitor B (222B) to be charged to the midpoint voltage.

For example, the reset circuitry and state machine (230) may close the precharge pass gate (224) and the evaluate pass gate (228), and charge collection capacitor A (222A) to the circuit voltage. The reset circuitry and state machine (230) may then charge collection capacitor B (222B) to ground. The reset circuitry and state machine (230) may then set the precharge pass gate (224) to low allowing the voltage from the collection capacitor A (222A) to charge collection capacitor B (222B). Collection capacitor A (222A) and capacitor B (222B) will equalize at one half the charge placed on the collection capacitor A (222A). The midpoint voltage may be an initial charge of the collection capacitor. The midpoint voltage may be a charge between a maximum charge on the collection capacitors and a charge to ground.

The evaluate pass gate (228), when open, allows the resulting voltage on the collection capacitors (collection capacitor A (222A), collection capacitor B (222B)) to be evaluated by the sense amps (sense amp A (232A), sense amp B (232B), sense amp C (232C), reset sense amp (238)). The sense amps (sense amp A (232A), sense amp B (232B), sense amp C (232C), reset sense amp (238)) compare the resulting voltage to a charge thresholds inputted on the sense amp reference inputs (sense amp A reference input (234A), sense amp B reference input (234B), sense amp C reference input (234C)) and a low charge threshold inputted on the reset sense amp reference input (240). The sense amps (sense amp A (232A), sense amp B (232B), sense amp C (232C), reset sense amp (238)) output, on the sense amp outputs (sense amp A output (236A), sense amp B output (236B), sense amp C output (236C), reset sense amp output (242)) an indication whether the resulting voltage on the collection capacitors exceeds the charge thresholds (sense amp A reference input (234A), sense amp B reference input (234B), sense amp C reference input (234C)) or drops below the reset threshold (sense amp reference input (240)). The sense amps may be any circuit or device able to detect whether a voltage threshold has been crossed. The signals on the sense amp outputs (sense amp A output (236A), sense amp B output (236B), sense amp C output (236C), reset sense amp output (242)) may be detected and read, for example, by a circuit controller.

The state machine (230) is a portion of the A-B circuit (200) configured to trigger the reset circuitry (via the reset true signal (226) and reset complement signal (220)). The state machine (230) may be configured to trigger the reset circuitry based on receiving a signal from one or more sense amp outputs indicating that the charge threshold voltage on the sense amp reference input has been exceeded by the charge on the collection capacitor(s). The state machine (230) may also be configured to precharge the collection capacitor(s).

The charge thresholds (sense amp A reference input (234A), sense amp B reference input (234B), sense amp C reference input (234C)) may be calculated as a function of a probability range, a confidence level, and a statistically significant number of units of charge. Each charge threshold (sense amp A reference input (234A), sense amp B reference input (234B), sense amp C reference input (234C), reset sense amp reference input (240)) may be calculated using different variables, including different confidence levels. Exceeding a threshold may indicate that the first set of data results has a greater number of positive data points than the second set of data results at a statistical significance and a specified confidence level. Each charge threshold (sense amp A reference input (234A), sense amp B reference input (234B), sense amp C reference input (234C)) may be calculated as a different confidence level. For example, sense amp A reference input (234A) may be calculated as a 99% confidence level, sense amp B reference input (234B) may be calculated as a 95% confidence level, and sense amp C reference input (234C) may be calculated as a 90% confidence level.

Statistical significance is a threshold difference between positive data points in the first set of data results and the second set of data results which mathematically indicates that positive data points in the first set of data results and positive data points in the second set of data results are not equiprobable and to what degree. A statistically significant difference between positive data points in the first set of data results and positive data points in the second set of data results indicates that positive data points in one set of data results occurs more frequently than positive data points in the other set of data results, accounting for the order in which the data results are received.

Each threshold is based on a difference in the number of positive data points in the first set of data results and the positive data points in the second set of data results, in terms of a number of units of charge. The unit of charge calculated for statistical significance, confidence level, and capacitance ratio of the charge capacitors to the collection capacitors may be the unit of charge added in response to data added via the data A input (204A) rather than the weighted second unit of charge added in response to data added via the data B input (204B). To determine how may units of charge above a midpoint voltage indicate a statistically significant difference, a probability range is selected based on system requirements, technical considerations, technical specifications, or other factors. A tolerance of unusual events or confidence level is also determined. The tolerance may vary depending on such factors as technical specifications and risk tolerance, but 1%, 5%, and 10% are common. For a given probability, 'p', and range (from 'p0' to 'p' to 'p1') and a confidence level ('alpha' and 'beta'), the following formula may be used to determine a number of units of charge above or below the midpoint voltage that would indicate statistical significance (where 'n' is the total number of positive data points in the sets A and B of data results, and 'y' is the number of positive data points in the first set of data results):

$$\ln(B) < an + by < \ln(A),$$

where $a = \ln\left(\frac{1-p1}{1-p0}\right)$, $b = \ln\left(\frac{p1}{p0}\right) - a$, $A = \frac{1-\text{beta}}{\text{alpha}}$, and $B = \frac{\text{beta}}{1-\text{alpha}}$.

Using a probability range of 'p0' equal to 'p' equal to 0.5, and 'p1' equal to 0.55, and a confidence level of 'alpha' equal to 1%, 5%, and 10% or 0.01, 0.05, and 0.1 and 'beta' equal to 1%, 5%, and 10% or 0.01, 0.05, and 0.1, the results of the formula are as follows:

For alpha/beta=10%: −23.1<y−1.1(n−y)<23.1,

For alpha/beta=5%: −30.9<y−1.1(n−y)<30.9,

For alpha/beta=1%: −48.2<y−1.1(n−y)<48.2,

Therefore, rounding down the units in this example, 23 units of charge above the midpoint voltage may indicate that positive data points in the first set of data results occur more than positive data points in the second set of data results to a statistically significant degree with a 90% confidence level. Further, 30 units of charge above the midpoint voltage may indicate that positive data points in the first set of data results occur more than positive data points in the second set of data results to a statistically significant degree with a 95% confidence level. Finally, 48 units of charge above the midpoint voltage may indicate that positive data points in the first set of data results occur more than positive data points in the second set of data results to a statistically significant degree with a 99% confidence level. This formula may be used to calculate a statistically significant number of units of charge regardless of the number of data points anticipated to be received.

Within the circuit, each calculated unit of charge for each of the three confidence levels may be used as a reference voltage for each of three sense amps. For example, sense amp A reference input (234A) may be set to the 99% confidence level (48 units of charge above the midpoint voltage), sense amp B reference input (234B) may be set to the 95% confidence level (30 units of charge above the midpoint voltage), and sense amp C reference input (234C) may be set to the 90% confidence level (23 units of charge above the midpoint voltage).

Based on the determined units of charge at a 99% confidence level, the ratio of the capacity of the charge capacitors to the collection capacitor may be calculated as a function of circuit voltage and the statistically significant number of units of charge. The following formula may be used to determine the ratio of the capacity of the charge capacitors (CapA, CapB) to the collection capacitor (Cap1), where VDD is the circuit voltage:

$$Cap1 = \left(\frac{\text{\# units of charge}}{\frac{VDD}{2} - (VDD*0.1)}\right) CapA$$

$$CapB = 1.1 * CapA$$

Using this formula, a circuit with a circuit voltage of 1.5V and a statistically significant number of units of charge of 48 units, the ratio of the collection capacitor(s) to charge capacitor A would be 80, and charge capacitor B would be 10% larger than charge capacitor A. The A-B circuit (200) may then be constructed with appropriately sized capacitors.

Figure 3:
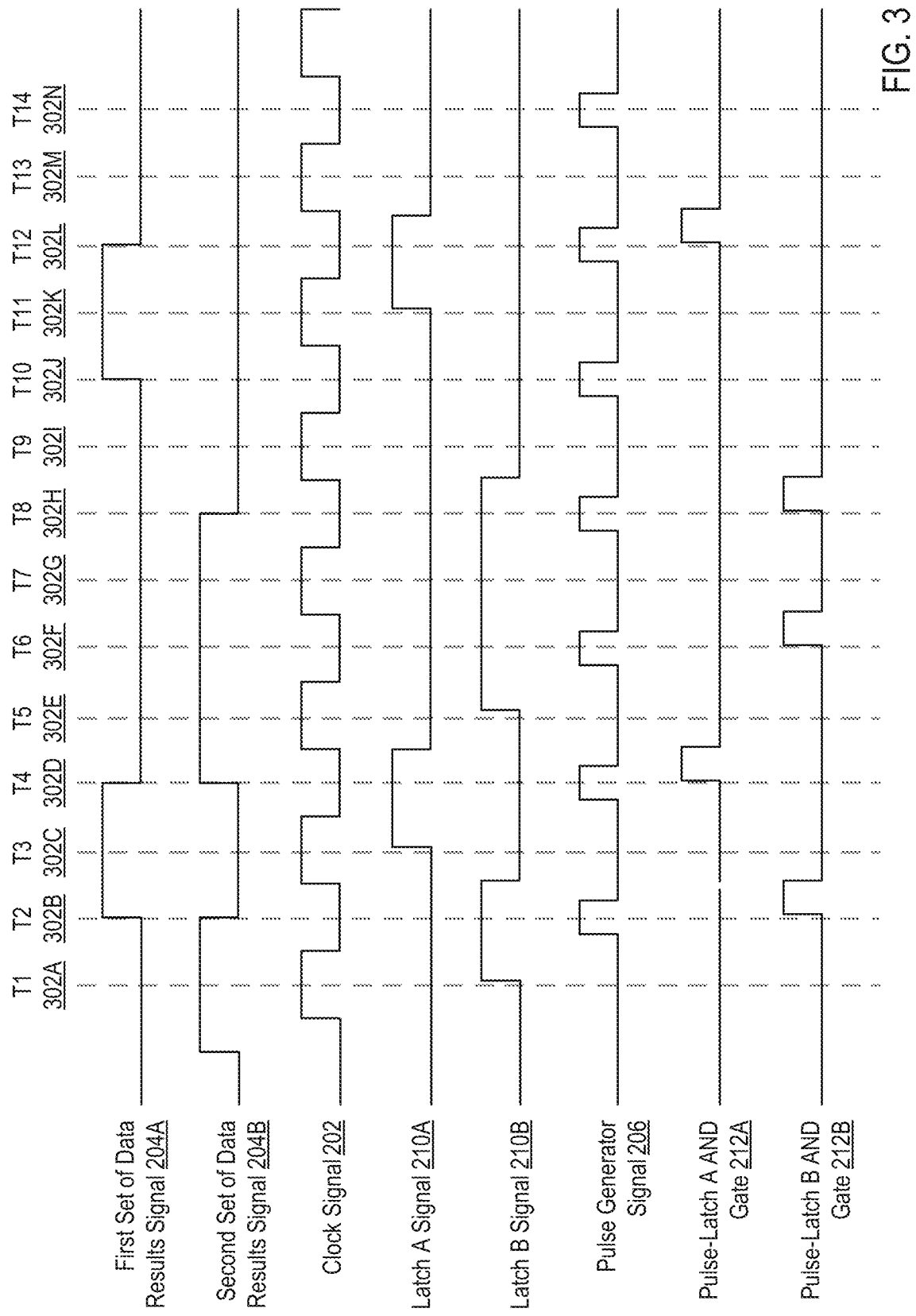
FIG. 3 sets forth a timeline illustrating an exemplary method for real time cognitive reasoning using a circuit with varying confidence level alerts according to embodiments of the present invention.

For further explanation, FIG. 3 shows an exemplary timeline for real time cognitive reasoning using a circuit with varying confidence level alerts according to embodiments of the invention. FIG. 3 shows the first set of data results signal (204A) that may be placed on the data A input of the circuit, the second set of data results signal (204B) that may be placed on the data B input of the circuit. FIG. 3 also shows a clock signal (202), a latch A signal (210A), a latch B signal (210B), a pulse generator signal (206), a pulse-latch A AND gate signal (212A), and a pulse-latch B AND gate signal (212B).

At time T1 (302A), a positive data result is received on the second set of data results signal (204B) and the clock signal (202) goes high. In response to the second set of data results signal (204B) and the clock signal (202) going high, the positive data result is stored in latch B (210B) and the charge FET B (214B) is opened, charging charge capacitor B (216B) to ground.

At time T2 (302B), the pulse generator signal (206) is high and the latch B signal (210B) is high, triggering the pulse-latch B AND gate (212B) to go high and opening the charge pass gate B (218B), which transfers the ground charge on charge capacitor B (216B) to the collection capacitors (collection capacitor A (222A), collection capacitor B (222B)).

At time T3 (302C), a positive data result is received on the first set of data results signal (204A) and the clock signal (202) goes high. In response to the first set of data results signal (204A) and the clock signal (202) going high, the positive data result is stored in latch A (210A) and the charge FET A (214A) is opened, charging charge capacitor A (216A) to the circuit voltage.

At time T4 (302D), the pulse generator signal (206) is high and the latch A signal (210A) is high, triggering the pulse-latch A AND gate (212A) to go high and opening the charge pass gate A (218A), which transfers the circuit voltage charge on charge capacitor A (216A) to the collection capacitors (collection capacitor A (222A), collection capacitor B (222B)).

At time T5 (302E), a positive data result is received on the second set of data results signal (204B) and the clock signal (202) goes high. In response to the second set of data results signal (204B) and the clock signal (202) going high, the positive data result is stored in latch B (210B) and the charge FET B (214B) is opened, charging charge capacitor B (216B) to ground.

At time T6 (302F), the pulse generator signal (206) is high and the latch B signal (210B) is high, triggering the pulse-latch B AND gate (212B) to go high and opening the charge pass gate B (218B), which transfers the ground charge on charge capacitor B (216B) to the collection capacitors (collection capacitor A (222A), collection capacitor B (222B)).

At time T7 (302G), a positive data result is received on the second set of data results signal (204B) and the clock signal (202) goes high. In response to the second set of data results signal (204B) and the clock signal (202) going high, the positive data result is stored in latch B (210B) and the charge FET B (214B) is opened, charging charge capacitor B (216B) to ground.

At time T8 (302H), the pulse generator signal (206) is high and the latch B signal (210B) is high, triggering the pulse-latch B AND gate (212B) to go high and opening the charge pass gate B (218B), which transfers the ground charge on charge capacitor B (216B) to the collection capacitors (collection capacitor A (222A), collection capacitor B (222B)).

At time T9 (302I), the clock is high, but no positive data result is received on either the first set of data results signal (204A) or the second set of data results signal (204B). Therefore, no signal is stored in either latch (latch A (210A), latch B (210B)) and neither charge FET (charge FET A (214A), charge FET B (214B)) is opened.

At time T10 (302J), the pulse generator signal (206) is high, but neither latch signal (latch A signal (210A), latch B signal (210B)) is high, so neither AND gate (pulse-latch A AND gate (212A), pulse-latch B AND gate (212B)) is triggered, and neither charge pass gate (charge pass gate A (218A), charge pass gate B (218B)) is opened.

At time T11 (302K), a positive data result is received on the first set of data results signal (204A) and the clock signal (202) goes high. In response to the first set of data results signal (204A) and the clock signal (202) going high, the positive data result is stored in latch A (210A) and the charge FET A (214A) is opened, charging charge capacitor A (216A) to the circuit voltage.

At time T12 (302L), the pulse generator signal (206) is high and the latch A signal (210A) is high, triggering the pulse-latch A AND gate (212A) to go high and opening the charge pass gate A (218A), which transfers the circuit voltage charge on charge capacitor A (216A) to the collection capacitors (collection capacitor A (222A), collection capacitor B (222B)).

At time T13 (302M), the clock is high, but no positive data result is received on either the first set of data results signal (204A) or the second set of data results signal (204B). Therefore, no signal is stored in either latch (latch A (210A), latch B (210B)) and neither charge FET (charge FET A (214A), charge FET B (214B)) is opened.

At time T14 (302N), the pulse generator signal (206) is high, but neither latch signal (latch A signal (210A), latch B signal (210B)) is high, so neither AND gate (pulse-latch A AND gate (212A), pulse-latch B AND gate (212B)) is triggered, and neither charge pass gate (charge pass gate A (218A), charge pass gate B (218B)) is opened.

Figure 4:
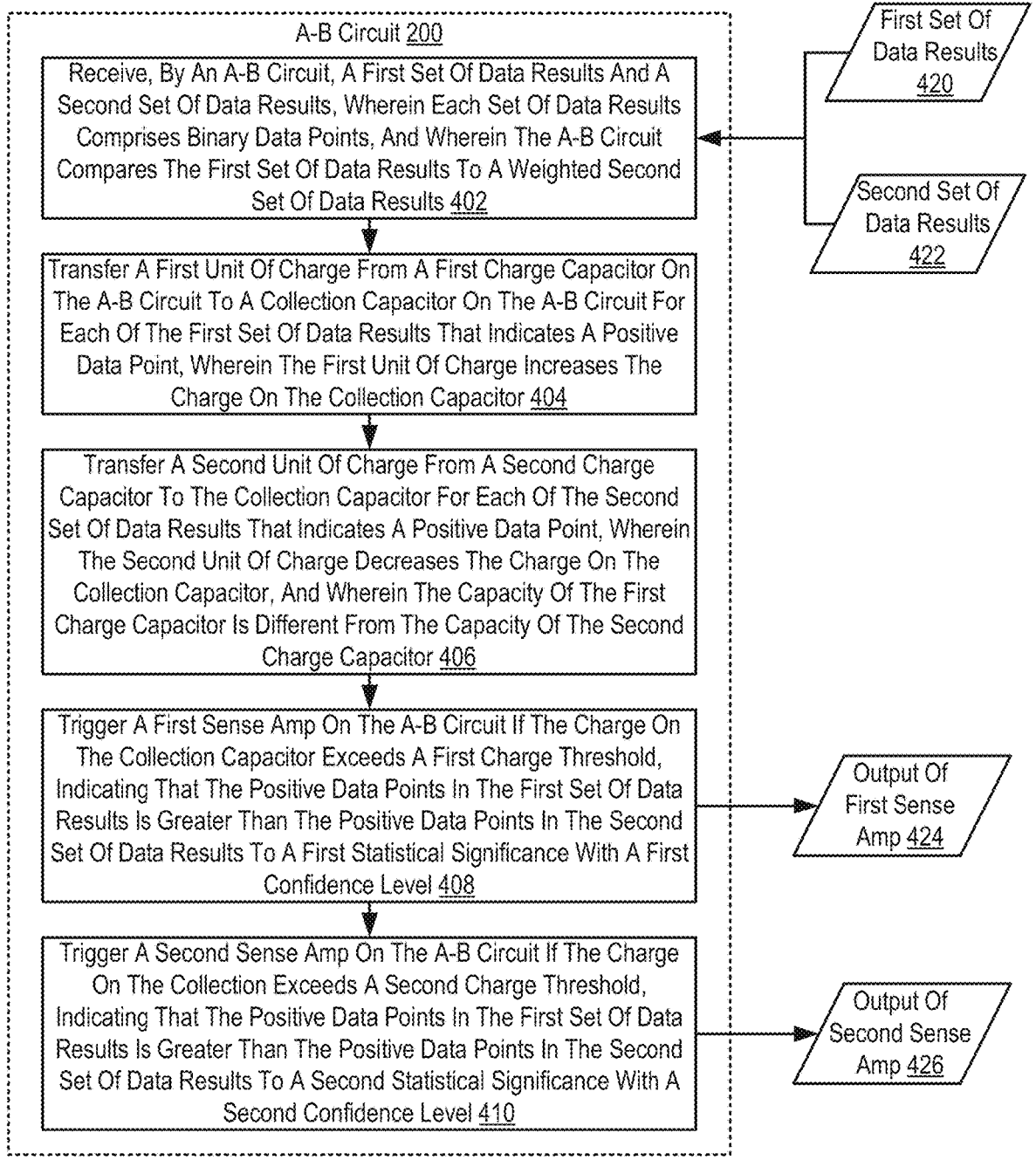
FIG. 4 sets forth a flow chart illustrating an exemplary method for real time cognitive reasoning using a circuit with varying confidence level alerts according to embodiments of the present invention.

For further explanation, FIG. 4 sets forth a flow chart illustrating an exemplary method for real time cognitive reasoning using a circuit with varying confidence level alerts according to embodiments of the present invention that includes receiving (402), by an A-B circuit (200), a first set of data results (420) and a second set of data results (422), wherein each set of data results comprises binary data points, and wherein the A-B circuit (200) compares the first set of data results (420) to a weighted second set of data results (422). Receiving ((402), by an A-B circuit (200), a first set of data results (420) and a second set of data results (422), wherein each set of data results comprises binary data points, and wherein the A-B circuit (200) compares the first set of data results (420) to a weighted second set of data results (422) may be carried out by applying the first set of data results (420) to a first data input of the circuit and the second set of data results (422) to a second data input of the circuit. Each set of data results (first set of data results (420), second set of data results (422)) may indicate a type of relationship between two or more tests performed under the same conditions. Specifically, the positive data points in the first set of data results indicate a first type of relationship between a first test and a second test, and wherein the positive data points in the second set of data results indicate a second type of relationship between the first test and the second test. Further, the first data point in each of the first set of data results and the second set of data results refers to the relationship between different tests performed under the same conditions (e.g., test performed on the same die).

For example, a set of non-yielding dies may undergo tests to determine whether certain circuits within the die match the specification for the die. Test 1 may be to determine whether a resistance for "via1" matches the specification, and test 2 may be to determine whether a resistance for "m1" matches the specification. Given the two tests, there are four types of relationships possible between test 1 and test 2: test 1 fails and test 2 fails (0,0), test 1 fails and test 2 passes (0,1), test 1 passes and test 2 fails (1,0), and test 1 passes and test 2 passes (1,1). For each die, one of the four relationships will result from the results of test 1 and test 2.

Given the four test relationships, data results can be generated. Data result A determines whether "via1" resistance and m1 resistance are both out of spec (i.e., is the test 1/test 2 relationship equal to (0,0)). Data result B determines whether "via1" resistance is out of spec and m1 resistance is in spec (i.e., is the test 1/test 2 relationship equal to (0,1)). Data result C determines whether "via1" resistance is in spec and "m1" resistance is out of spec (i.e., is the test 1/test 2 relationship equal to (1,0)). Data result 4 determines whether "via1" resistance and "m1" resistance are both in spec (i.e., is the test 1/test 2 relationship equal to (1,1)). Data result D may be ignored because the occurrence of both test 1 and test 2 passing may not be relevant to determining correlations between failing tests on non-yielding dies.

For each test1/test2 relationship, each data result will have corresponding results. For the test1/test2 relationship (0,0), data result A will be '1' (positive), data result B will be '0' (negative), data result C will be '0' (negative), and data result D will be '0' (negative). For the test1/test2 relationship (0,1), result A will be '0' (negative), data result B will be '1' (positive), data result C will be '0' (negative), and data result D will be '0' (negative). For the test1/test2 relationship (1,0), data result A will be '0' (negative), data result B will be '0' (negative), data result C will be '1' (positive), and data result D will be '0' (negative). Finally, for the test1/test2 relationship (1,1), data result A will be '0' (negative), data result B will be '0' (negative), data result C will be '0' (negative), and data result D will be '1' (positive). The above example may be summarized using the following table:

TABLE 1

| Test 1 | Test 2 | Data Result A | Data Result B | Data Result C | Data Result D |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

The circuit may be utilized to determine (very quickly and using little power) whether one data result occurs more frequently to a statistically significant degree than another data result. To that end, if two tests (e.g., one with probability range of 'p0' equal to 'p' equal to 0.5 and 'p1' equal to 0.55 and one with probability range of 'p0' equal to 0.45 and 'p' equal to 'p1' equal to 0.55) are performed on each of a set of conditions (e.g., a set of dies or computer chips), six comparisons may be made using the circuit: data result A compared to weighted data result B, data result B compared to weighted data result A, data result A compared to weighted data result C, data result C compared to weighted data result A, data result B compared to weighted data result C, and data result C compared to weighted data result B. Once again, data result D may be ignored because the occurrence of both test 1 and test 2 passing may not be relevant to determining correlations between failing tests on non-yielding dies.

The method of FIG. 4 also includes transferring (404) a first unit of charge from a first charge capacitor on the A-B circuit (200) to a collection capacitor on the A-B circuit (200) for each of the first set of data results (420) that indicates a positive data point, wherein the first unit of charge increases the charge on the collection capacitor. Transferring (404) a first unit of charge from a first charge capacitor on the A-B circuit (200) to a collection capacitor on the A-B circuit (200) for each of the first set of data results (420) that indicates a positive data point, wherein the first unit of charge increases the charge on the collection capacitor may be carried out by generating a positive unit of charge on the first charge capacitor and transferring that unit of charge to the one or more collection capacitors. The unit of charge may be generated by charging a charge capacitor to a certain voltage, such as the circuit voltage, and opening a switch such as a pass gate that transfers the charge to the collection capacitor. The collection capacitor may be more than one capacitor operating a single capacitor.

The method of FIG. 4 also includes transferring (406) a second unit of charge from a second charge capacitor to the collection capacitor for each of the second set of data results (422) that indicates a positive data point, wherein the second unit of charge decreases the charge on the collection capacitor, and wherein the capacity of the first charge capacitor is different from the capacity of the second charge capacitor. Transferring (406) a second unit of charge from a second charge capacitor to the collection capacitor for each of the second set of data results (422) that indicates a positive data point, wherein the second unit of charge decreases the charge on the collection capacitor, and wherein the capacity of the first charge capacitor is different from the capacity of the second charge capacitor may be carried out by generating a unit of charge on the second charge capacitor and transferring that unit of charge to the one or more collection capacitors. The second unit of charge may be generated by charging a charge capacitor to ground and opening a switch such as a pass gate that transfers the negative charge to the collection capacitor.

Because the capacity of the second charge capacitor is different from the charge on the first charge capacitor, the second unit of charge may be different than the first unit of charge. For example, the second charge capacitor may be 10% larger than the capacity of the first capacitor. Therefore, the second unit of charge may be larger than the first unit of charge. Further, transferring one first unit of charge from the first charge capacitor and one second unit of charge from the second charge capacitor to a collection capacitor charged to a midpoint voltage may cause the resulting voltage on the collection capacitor to be lower than the midpoint voltage. The unit of charge calculated for statistical significance, confidence level, and capacitance ratio of the charge capacitors to the collection capacitors may be the first unit of charge rather than the weighted second unit of charge.

The method of FIG. 4 also includes triggering (408) a first sense amp on the A-B circuit (200) if the charge on the collection capacitor exceeds a first charge threshold, indicating that the positive data points in the first set of data results is greater than the positive data points in the second set of data results to a first statistical significance with a first confidence level. Triggering (408) a first sense amp on the A-B circuit (200) if the charge on the collection capacitor exceeds a first charge threshold, indicating that the positive data points in the first set of data results is greater than the positive data points in the second set of data results to a first statistical significance with a first confidence level may be carried out by comparing the charge on the collection capacitor to a voltage on a first sense amp reference input. Triggering (408) the first sense amp may be carried out by placing a signal on the first sense amp output (424) indicating that the voltage on the sense amp reference input has been exceeded by the input from the collection capacitor.

The first charge threshold may be a voltage applied to the first sense amp reference input. Further, the first charge threshold may be equivalent to the midpoint voltage combined with the statistically significant number of units of charge with the first confidence level. Exceeding the first charge threshold indicates that the charge on the collection capacitor is at least as high as the midpoint voltage combined with the statically significant number of units of charge with the first confidence level.

The method of FIG. 4 also includes triggering (410) a second sense amp on the A-B circuit (200) if the charge on the collection exceeds a second charge threshold, indicating that the positive data points in the first set of data results is greater than the positive data points in the second set of data results to a second statistical significance with a second confidence level. Triggering (410) a second sense amp on the A-B circuit (200) if the charge on the collection exceeds a second charge threshold, indicating that the positive data points in the first set of data results is greater than the positive data points in the second set of data results to a second statistical significance with a second confidence level may be carried out by comparing the charge on the collection capacitor to a voltage on a second sense amp reference input. Triggering (408) the second sense amp may be carried out by placing a signal on the second sense amp output (426) indicating that the voltage on the sense amp reference input has been exceeded by the input from the collection capacitor.

The second charge threshold may be a voltage applied to the second sense amp reference input. Further, the second charge threshold may be equivalent to the midpoint voltage combined with the statistically significant number of units of charge with the second confidence level. Exceeding the second charge threshold indicates that the charge on the collection capacitor is at least as high as the midpoint voltage combined with the statically significant number of units of charge with the second confidence level.

The first statically significant number of units of charge with the first confidence level may be fewer units of charge than the second statically significant number of units of charge with the second confidence level. For example, the reference input on the first sense amp may be a voltage equivalent to the midpoint voltage on the collection capacitor plus 23 units of charge for a 90% confidence level. The reference input on the second sense amp may be a voltage equivalent to the midpoint voltage on the collection capacitor plus 48 units of charge for a 99% confidence level. Consequently, if the second sense amp is triggered, the first sense amp would also necessarily be triggered at the same time. The first statistical significance may be equivalent to the second statistical significance, and the first confidence level may be different than the second confidence level.

As an example, a circuit (200) may be used to determine whether the occurrence of dies in which "vial" resistance is out of spec and ml resistance is in spec (first set of data results (420)) is equiprobable to the occurrence of dies in which "vial" resistance is in spec and "ml" resistance is out of spec (second set of data results (422)). A probability range of 0.5 to 0.55 may be used with a tolerance of unusual events of 10% and 1%. Based on these values, 23 units of charge may be determined to be statistically significant for the first confidence level (90%), and 48 units of charge may be determined to be statistically significant for the second confidence level (99%). Therefore, the first charge threshold is set to 23 units of charge above the midpoint voltage and the second charge threshold is set to 48 units of charge above the midpoint voltage.

As the first set of data results and the second set of data results are applied to the A-B circuit (200) assume that at time T1, the A-B circuit (200) has received 2055 positive data points in the first set of data results and 1842 positive data points in the second set of data results. 2055 units of charge would have been placed on the collection capacitor for the first set of data results and 2026.2 weighted units of charge would have been placed on the collection capacitor for the second set of data results. Therefore, the charge on the collection capacitor would be 29 units of charge above a midpoint voltage, exceeding the first charge threshold. Consequently, the first sense amp is triggered, and an indication is placed on the output of the first sense amp that the first charge threshold is exceeded. The second sense amp remains untriggered.

Continuing with the example, assume at time T2, the A-B circuit (200) has received 2370 positive data points in the first set of data results and 2100 positive data points in the second set of data results. 2370 units of charge would have been placed on the collection capacitor for the first set of data results and 2310 weighted units of charge would have been placed on the collection capacitor for the second set of data results. Therefore, the charge on the collection capacitor would be 60 units of charge above a midpoint voltage, exceeding the first charge threshold and the second charge threshold. Consequently, the first sense amp is triggered, and an indication is placed on the output of the first sense amp that the first charge threshold is exceeded. Further, the second sense amp is also triggered, and an indication is placed on the output of the second sense amp that the second charge threshold is exceeded.

Figure 5:
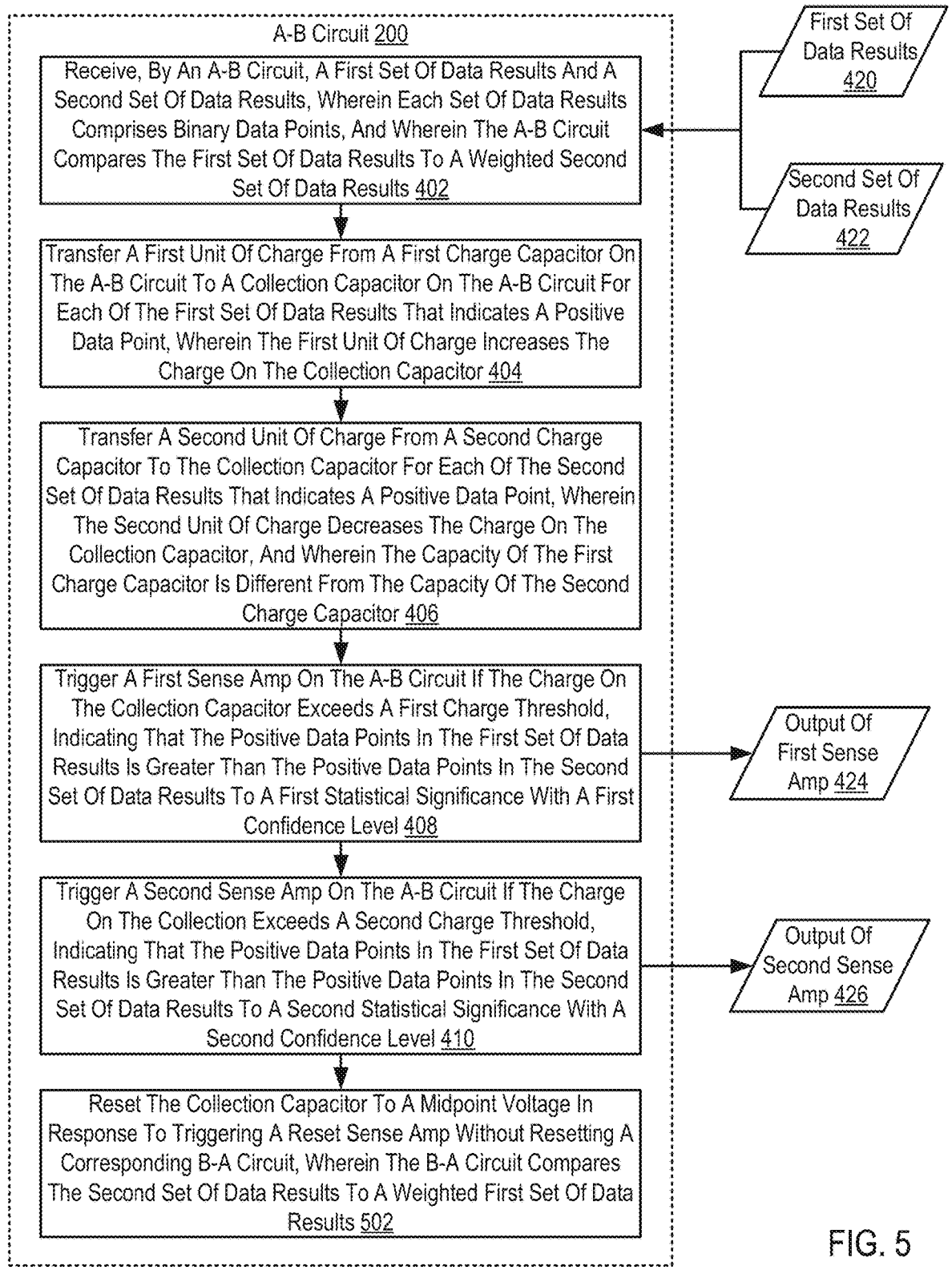
FIG. 5 sets forth a flow chart illustrating an exemplary method for real time cognitive reasoning using a circuit with varying confidence level alerts according to embodiments of the present invention.

For further explanation, FIG. 5 sets forth a flow chart illustrating a further exemplary method for real time cognitive reasoning using a circuit with varying confidence level alerts according to embodiments of the present invention that includes receiving (402), by an A-B circuit (200), a first set of data results (420) and a second set of data results (422), wherein each set of data results comprises binary data points, and wherein the A-B circuit (200) compares the first set of data results (420) to a weighted second set of data results (422); transferring (404) a first unit of charge from a first charge capacitor on the A-B circuit (200) to a collection capacitor on the A-B circuit (200) for each of the first set of data results (420) that indicates a positive data point, wherein the first unit of charge increases the charge on the collection capacitor; transferring (406) a second unit of charge from a second charge capacitor to the collection capacitor for each of the second set of data results (422) that indicates a positive data point, wherein the second unit of charge decreases the charge on the collection capacitor, and wherein the capacity of the first charge capacitor is different from the capacity of the second charge capacitor; triggering (408) a first sense amp on the A-B circuit (200) if the charge on the collection capacitor exceeds a first charge threshold, indicating that the positive data points in the first set of data results is greater than the positive data points in the second set of data results to a first statistical significance with a first confidence level; and triggering (410) a second sense amp on the A-B circuit (200) if the charge on the collection exceeds a second charge threshold, indicating that the positive data points in the first set of data results is greater than the positive data points in the second set of data results to a second statistical significance with a second confidence level.

The method of FIG. 5 differs from the method of FIG. 4, however, in that the method of FIG. 5 further includes resetting (502) the collection capacitor to a midpoint voltage in response to triggering a reset sense amp without resetting a corresponding B-A circuit, wherein the B-A circuit compares the second set of data results to a weighted first set of data results. Resetting (502) the collection capacitor to a midpoint voltage in response to triggering a reset sense amp without resetting a corresponding B-A circuit, wherein the B-A circuit compares the second set of data results to a weighted first set of data results may be carried out by the output of a reset sense amp signaling to the reset circuitry to perform a reset. The output may be sent to a state machine which triggers the reset circuitry. The reset may include discharging the collection capacitors and precharging the collection capacitors.

The A-B circuit (200) may be part of a pair of circuits that includes an inverse B-A circuit. The B-A circuit may be identical, or nearly identical, to the A-B circuit (200). The B-A circuit may place the first set of data results and the second set of data results in the opposite inputs relative to the A-B circuit (200). Consequently, the B-A circuit compares the second set of data results to a weighted first set of data results. The A-B circuit (200) and the B-A circuit may receive the same sets of data in the same order.

The reset sense amp is a sense amp with a reference input equivalent to a low voltage threshold. The A-B circuit may include a reset sense amp configured to detect whether the number of positive data points in the first set of data results drops below the weighted number of positive data points in the second set of data results to a statistical significance with a certain confidence level. The reset reference input may be a voltage equivalent to the converse of number of units of charge of the highest (e.g., 99%) confidence level (e.g., 48 units of charge below the midpoint voltage). Triggering the reset sense amp may be carried out by detecting that the charge on the collection capacitors has fallen below the reset sense amp reference input.

Figure 6:
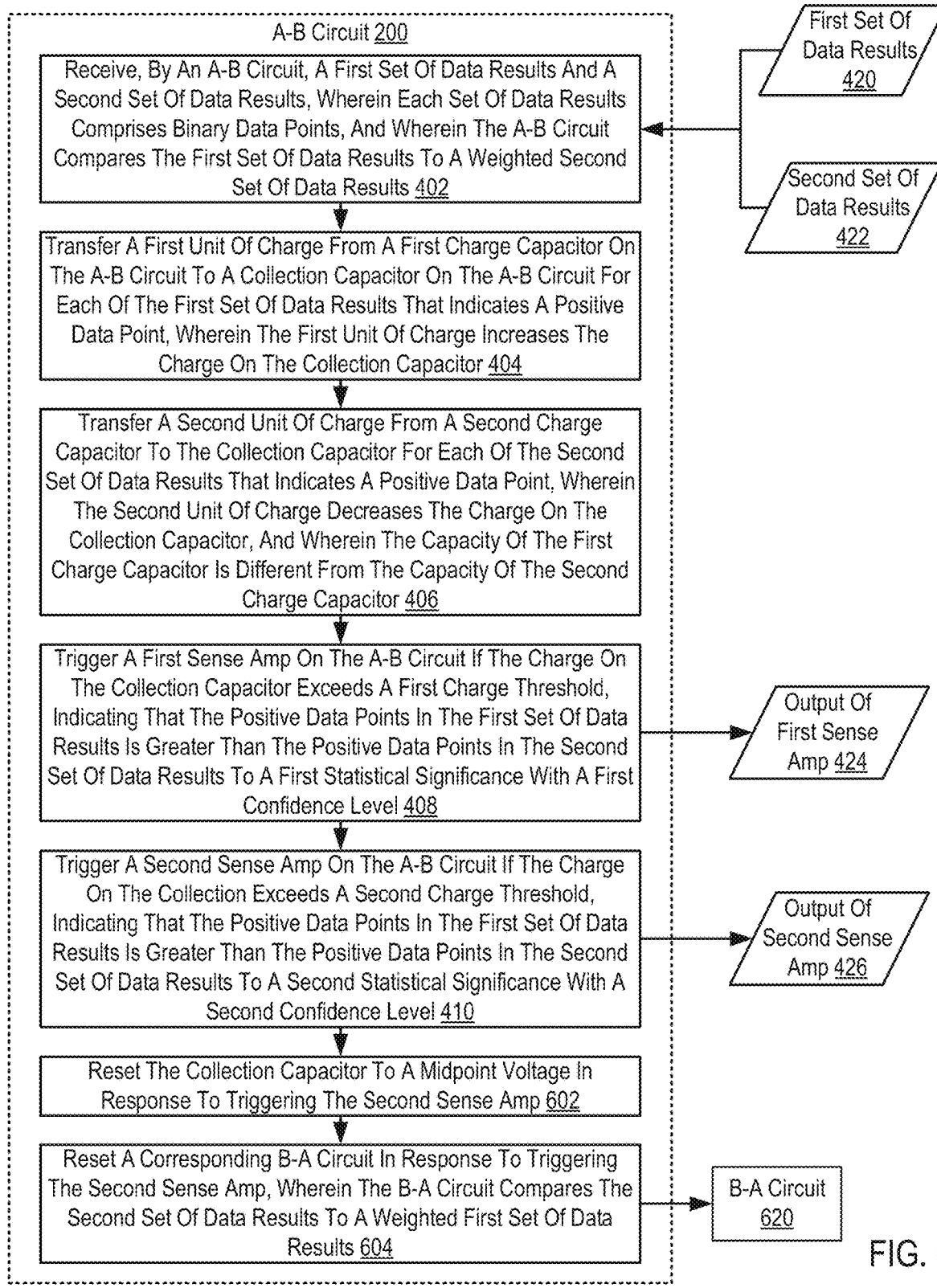
FIG. 6 sets forth a flow chart illustrating an exemplary method for real time cognitive reasoning using a circuit with varying confidence level alerts according to embodiments of the present invention.

For further explanation, FIG. 6 sets forth a flow chart illustrating a further exemplary method for real time cognitive reasoning using a circuit with varying confidence level alerts according to embodiments of the present invention that includes receiving (402), by an A-B circuit (200), a first set of data results (420) and a second set of data results (422), wherein each set of data results comprises binary data points, and wherein the A-B circuit (200) compares the first set of data results (420) to a weighted second set of data results (422); transferring (404) a first unit of charge from a first charge capacitor on the A-B circuit (200) to a collection capacitor on the A-B circuit (200) for each of the first set of data results (420) that indicates a positive data point, wherein the first unit of charge increases the charge on the collection capacitor; transferring (406) a second unit of charge from a second charge capacitor to the collection capacitor for each of the second set of data results (422) that indicates a positive data point, wherein the second unit of charge decreases the charge on the collection capacitor, and wherein the capacity of the first charge capacitor is different from the capacity of the second charge capacitor; triggering (408) a first sense amp on the A-B circuit (200) if the charge on the collection capacitor exceeds a first charge threshold, indicating that the positive data points in the first set of data results is greater than the positive data points in the second set of data results to a first statistical significance with a first confidence level; and triggering (410) a second sense amp on the A-B circuit (200) if the charge on the collection exceeds a second charge threshold, indicating that the positive data points in the first set of data results is greater than the positive data points in the second set of data results to a second statistical significance with a second confidence level.

The method of FIG. 6 differs from the method of FIG. 4, however, in that FIG. 6 further includes resetting (602) the collection capacitor to a midpoint voltage in response to triggering the second sense amp; and resetting (604) a corresponding B-A circuit (620) in response to triggering the second sense amp, wherein the B-A circuit (620) compares the second set of data results to a weighted first set of data results. Resetting (602) the collection capacitor to a midpoint voltage in response to triggering the second sense amp may be carried out by the output of the second sense amp signaling to the reset circuitry to perform a reset. The output may be sent to a state machine which triggers the reset circuitry. The reset may include discharging the collection capacitors and precharging the collection capacitors.

Resetting (604) a corresponding B-A circuit (620) in response to triggering the second sense amp, wherein the B-A circuit (620) compares the second set of data results to a weighted first set of data results may be carried out by sending a signal to the B-A circuit (620) instructing the B-A circuit (620) to perform a reset. The signal to the B-A circuit (620) may be sent via a state machine on the A-B circuit (200), a state machine on the B-A circuit (620), or a state machine shared between the circuits.

In view of the explanations set forth above, readers will recognize that the benefits of real time cognitive reasoning using a circuit with varying confidence level alerts according to embodiments of the present invention include:

Utilizing custom circuits to perform near-real-time analysis of test results that is orders of magnitude more efficient than traditional methods and requires less time.

Utilizing custom circuits to quickly and efficiently evaluate large amounts of data to approximate trends and flag anomalies, increasing data evaluation efficiency.

Utilizing custom circuits to quickly and efficiently flag statistically significant differences in received data results without requiring knowledge of the total number of samples.

Utilizing custom circuits to simultaneously detect statistically significant differences with varying confidence levels in received data results quickly and efficiently.

Exemplary embodiments of the present invention are described largely in the context of a fully functional computer system for real time cognitive reasoning using a circuit with varying confidence level alerts. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of real time cognitive reasoning using a circuit with varying confidence level alerts, the method comprising:
    receiving, by an A-B circuit, a first set of data results and a second set of data results, wherein each set of data results comprises binary data points, and wherein the A-B circuit compares the first set of data results to a weighted second set of data results;
    transferring a first unit of charge from a first charge capacitor on the A-B circuit to a collection capacitor on the A-B circuit for each of the first set of data results that indicates a positive data point, wherein the first unit of charge increases the charge on the collection capacitor;
    transferring a second unit of charge from a second charge capacitor to the collection capacitor for each of the second set of data results that indicates a positive data point, wherein the second unit of charge decreases the charge on the collection capacitor, and wherein the capacity of the first charge capacitor is different from the capacity of the second charge capacitor;
    triggering a first sense amp on the A-B circuit if the charge on the collection capacitor exceeds a first charge threshold, indicating that the positive data points in the first set of data results is greater than the positive data points in the second set of data results to a first statistical significance with a first confidence level; and
    triggering a second sense amp on the A-B circuit if the charge on the collection exceeds a second charge threshold, indicating that the positive data points in the first set of data results is greater than the positive data points in the second set of data results to a second statistical significance with a second confidence level.

2. The method of claim 1, further comprising:
resetting the collection capacitor to a midpoint voltage in response to triggering a reset sense amp without resetting a corresponding B-A circuit, wherein the B-A circuit compares the second set of data results to a weighted first set of data results.

3. The method of claim 1, further comprising:
resetting the collection capacitor to a midpoint voltage in response to triggering the second sense amp; and
resetting a corresponding B-A circuit in response to triggering the second sense amp, wherein the B-A circuit compares the second set of data results to a weighted first set of data results.

4. The method of claim 1, wherein the first charge threshold is between a midpoint voltage and the second charge threshold, and wherein the first sense amp is triggered before the second sense amp is triggered.

5. The method of claim 1, wherein the ratio of the capacity of the first charge capacitor and the second charge capacitor to the collection capacitor is a function of a circuit voltage and a statistically significant number of units of charge.

6. The method of claim 1, wherein the first charge threshold is calculated as a function of a probability range, the first confidence level, and a statistically significant number of units of charge, and wherein the second charge threshold is calculated as a function of a probability range, the second confidence level, and a statistically significant number of units of charge.

7. The method of claim 1, wherein the positive data points in the first set of data results indicate a first type of relationship between a first test result and a second test result, and wherein the positive data points in the second set of data results indicate a second type of relationship between the first test result and the second test result.

* * * * *